United States Patent [19]

Taylor

[11] Patent Number: 4,923,221

[45] Date of Patent: May 8, 1990

[54] SAFETY CONNECTION INTO PASSAGES IN A TUBULAR BODY

[75] Inventor: Kennard W. Taylor, Houston, Tex.

[73] Assignee: Cameron Iron Works U.S.A., Inc., Houston, Tex.

[21] Appl. No.: 301,665

[22] Filed: Jan. 25, 1989

[51] Int. Cl.⁵ .............................................. F16L 17/02
[52] U.S. Cl. ..................................... 285/81; 285/354; 285/376; 285/901; 285/924
[58] Field of Search .................. 285/81, 924, 376, 377, 285/354, 901

[56] References Cited

U.S. PATENT DOCUMENTS

| | | | |
|---|---|---|---|
| 1,664,125 | 3/1928 | Lowrey | 285/924 X |
| 3,540,760 | 11/1970 | Miller et al. | 285/354 X |
| 3,574,359 | 4/1971 | Klein | 285/86 |
| 3,847,421 | 11/1974 | Eschbaugh et al. | 285/924 X |
| 4,126,335 | 11/1978 | Voss | 285/81 X |
| 4,133,560 | 1/1979 | Ishikawa et al. | 285/81 |
| 4,249,670 | 2/1981 | Hug | 220/295 |
| 4,316,316 | 2/1982 | Kappenhagen | 285/354 X |
| 4,750,765 | 6/1988 | Cassidy et al. | 285/924 X |
| 4,801,160 | 1/1989 | Barrington | 285/81 |

FOREIGN PATENT DOCUMENTS

| | | | |
|---|---|---|---|
| 257681 | 8/1963 | Australia | 285/81 |
| 2450 | 6/1985 | PCT Int'l Appl. | 285/924 |

*Primary Examiner*—Thomas F. Callaghan

[57] ABSTRACT

A safety connection for connecting a plug into a tubular member, the tubular member having an internal sealing surface, an internal recess positioned outward from said internal sealing surface, said recess ending in inwardly extending lip with a plurality of slots therethrough and external threads; a plug having a body with a plurality of radially extending pins positioned to pass through said slots in said lip, a radially extending flange and a pin extending radially outward from the plug at a position immediately axially inward of said flange and being out of axial alignment with said pins and sized to fit within one of said slots to position said plurality of pins out of alignments with said slots; and a securing ring having an inwardly extend flange for surrounding the exterior of said plug on the exterior side of said plug flange and internal threads for engaging the external threads on said tubular member to secure said plug in said tubular.

6 Claims, 3 Drawing Sheets

SAFETY CONNECTION INTO PASSAGES IN A TUBULAR BODY

BACKGROUND

The present invention relates to an improved connection for a blanking plug and bonnet to be used in being secured to a choke body so that they will not be a hazard while being removed from the choke body or when subjected to corrosive fluids.

Prior to the present invention chokes designed for use with corrosive fluids such as hydrogen sulphide have had threaded connections for connecting the blanking plug and the bonnet to the choke body. As these threads are subjected to the corrosive action of the fluids passing through the choke, the corrosive fluids have been found to attack the threaded connections between the body and each of the blanking plug and the bonnet.

Additionally, chokes have had a blanking plug connected into the choke body by the use of a securing ring or nut and have included a tapered sealing shoulder for engaging the tapered seat within the choke body. This structure is illustrated in the drawings and described in the specification. The disadvantage of such structure is that if the securing ring or nut is unthreaded while there is pressure in the choke body, the blanking plug will be forcibly ejected from within the choke body.

The U.S. Pat. No. 4,133,560 discloses a plug for connecting into a pressure container and the plug includes an outer flange and inner opposed projections which pass through recesses in the hole in the pressure container so that when the plug is rotated the projections and the flange engage opposite sides of the wall of the pressure contained. This structure is designed to protect the plug from releasing from the wall if the weld securing the plug to the container fails.

U.S. Pat. No. 3,574,359 discloses a conduit coupling including a socket and a plug with the plug being fully inserted into the socket and detents in the socket held in place by a sleeve threaded to the exterior of the socket to retain the plug in its desired connected position.

U.S. Pat. No. 4,249,670 a cap for connection to a pressure tank and having a pressure venting means which allows tank pressure to be vented prior to unlocking and removing the cap. The cap assembly includes an internal tubular member threaded onto a tube connecting to the pressure tank and a cap surrounding the tubular member and having a J slot and pin type of connection therebetween. The cap is biased in a direction to maintain its connection to the tubular member and at a position in which there is a seal between the exterior of the tubular member and the interior of the cap. The cap includes an inner groove which when opposite the seal allows venting of the pressure from the interior of the tubular member.

Some companies have in the past provided fittings and joints which involve the inclusion of a plug held within the passage by a gland nut and a vent port which allows the venting of any fluid under pressure to which the plug is exposed prior to the completion of the unthreading of the gland nut.

SUMMARY

The present invention is directed to an improved connection to a choke body or other type of valve body which protects the connection against release even when subjected to severely corrosive fluids. The connection is secured into an opening in a choke body and includes the element which is to be secured to the body, a nut which is threaded to the exterior of the body around the opening into the body, external flange on the element to be engaged by the nut, sealing means between the inner exterior of the element and the interior of the body opening, a plurality of pins and a slotted rib providing a safety connection between the element and the body and means for controlling the relative rotary positioning of the element within the body opening to assist in the proper positioning of the pins and slotted rib safety connection.

An object of the present invention is to provide an improved connection for securing a body to a structure containing corrosive fluids under pressure in which the connection can allow vent of trapped pressure but without releasing the plug even when the nut holding the plug is completely released.

Another object is to provide a connection for a blanking plug or bonnet into a choke which prevents the launching of the plug and bonnet from the choke should the pressure containing connection fail under pressure.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 5:
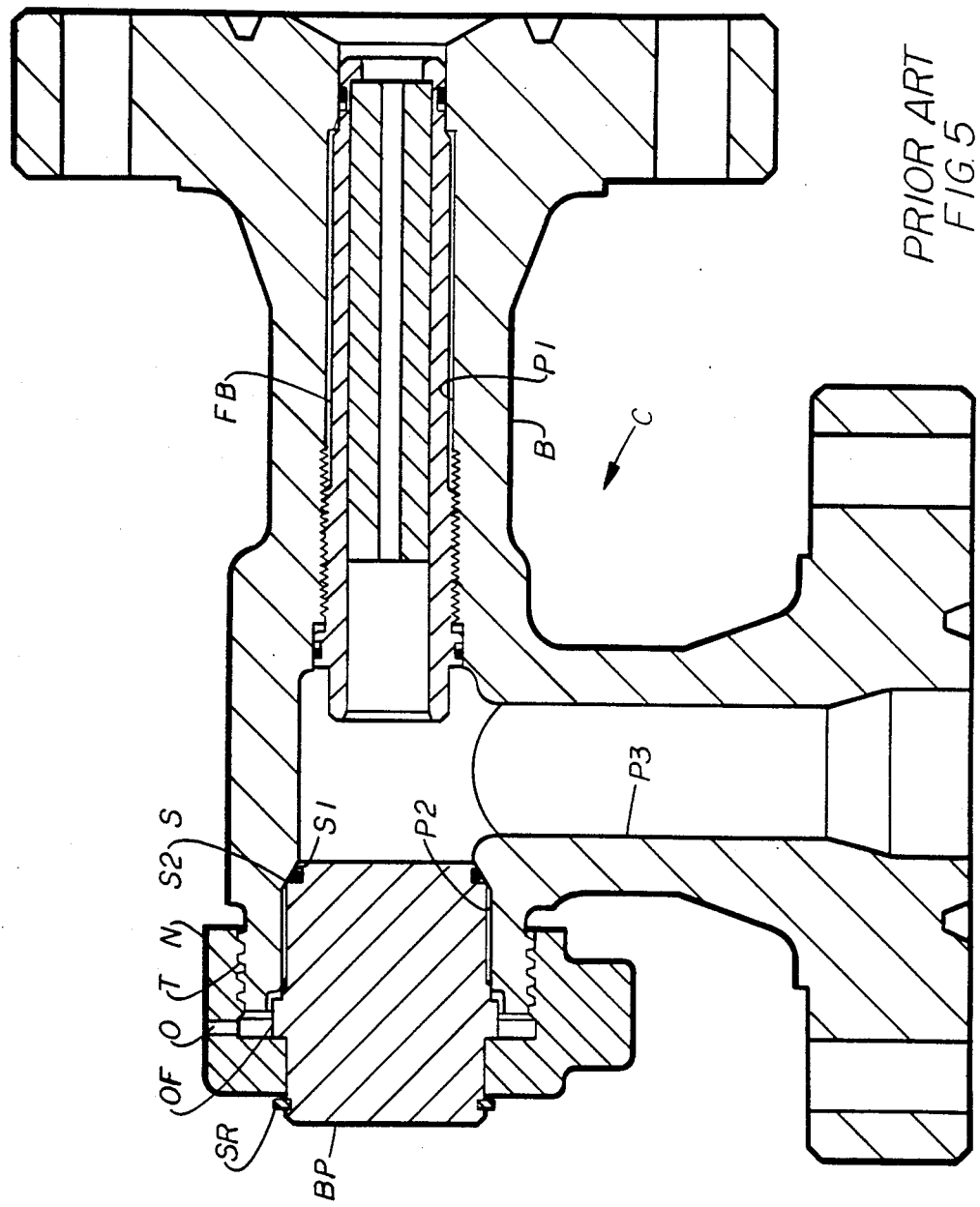
FIG. 5 is a sectional view of a prior art choke having a flow bean mounted in one of its body passages and a blanking plug secured in another of its body passages.

Choke C of the prior art as illustrated in FIG. 5 includes the body B having passages P1, P2 and P3. Flow bean FB is threaded into passage P1 and blanking plug BP is positioned in passage P2. Tapered seat S1 is provided near the inner end of passage P2 and blanking plug BP includes seal S on its tapered inner shoulder S2 which sealingly engages tapered seat S1. Threaded securing ring or nut N engages external threads T on the exterior of body B surrounding passage P2 to retain blanking plug BP within passage P2. Nut N is held in position around blanking plug BP between snap ring SR and outer flange OF on blanking plug BP. If nut N is unthreaded while there is pressure within choke body B, the pressure may forcibly eject blanking plug BP out of passage P2. Nut N includes the provision of an opening or port O through which some bleeding of the pressure may occur during the unthreading after seal S disengages from tapered seat S1.

Figure 1:
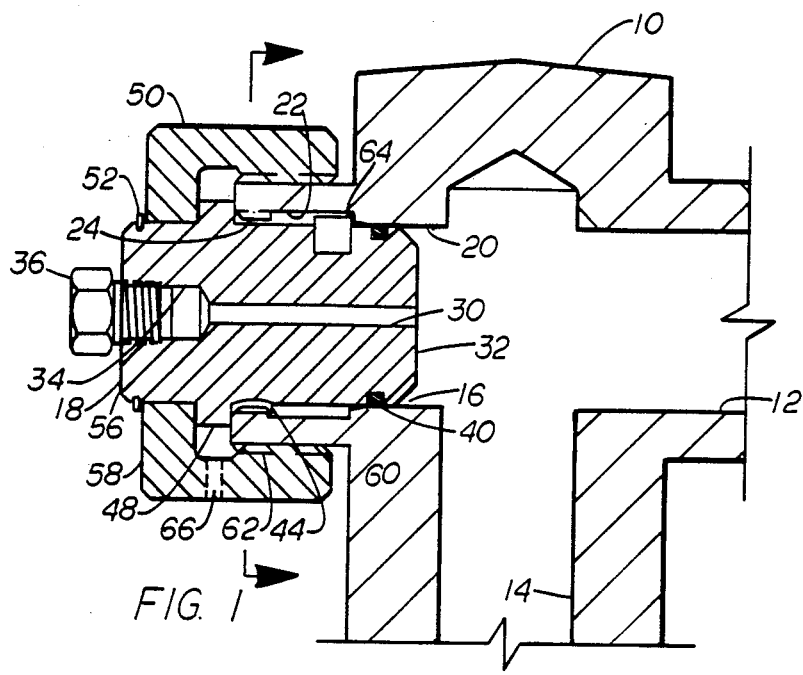
FIG. 1 is a sectional view of a portion of the body of a choke adapted to use a flow bean for its flow restriction and illustrating the improved connection of a blanking plug into the choke body.
Figure 4:
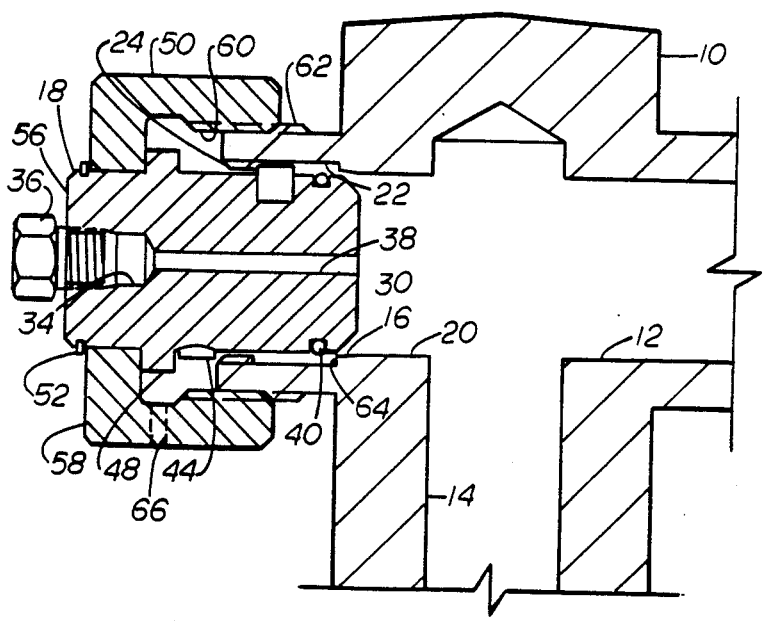
FIG. 4 is a sectional view similar to FIG. 1 but with the blanking plug moved to its pressure relieving position.

In the improved structure of the present invention, choke body 10 is partially shown in FIGS. 1 and 4 and includes internal passages 12, 14 and 16 which all intersect within body 10 as shown. Passage 16 is closed by blanking plug 18 which is used for this function in those chokes in which the flow restriction is provided by a flow bean (not shown) or other restriction mounted in one of the other passages 12 or 14. In the event that a variable choke is to be provided then a bonnet (not shown) which would carry the movable plug or needle which coacts with a seat to restrict flow through the passages is secured to body 10 and extends into passage 16 in the same manner as blanking plug 18. In such structure the bonnet would be constructed similarly to blanking plug 18 to embody the improved connection of the present invention for its connection into the choke body 10.

Figure 3:
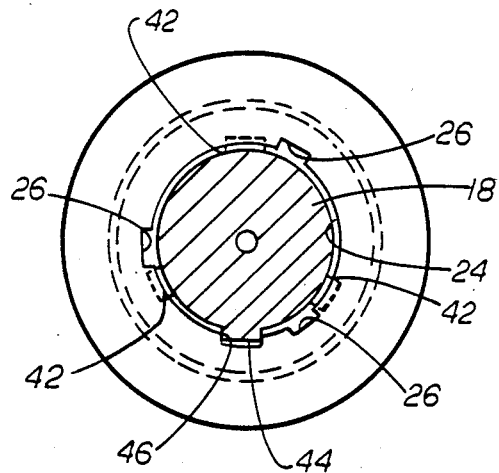
FIG. 3 is a sectional view taken along line 3—3 in FIG. 1 to show the relative position of the choke body and the blanking plug which form the improved connection of the present invention.

Passage 16 includes annular sealing surface 20 extending from the intersection of passage 16 with passage 14 and annular recess 22 extending from the outer end of surface 20 to inwardly directed lip 24. Three slots 26 are provided in lip 24 as best seen in FIG. 3 for the purpose hereinafter explained.

Figure 2:
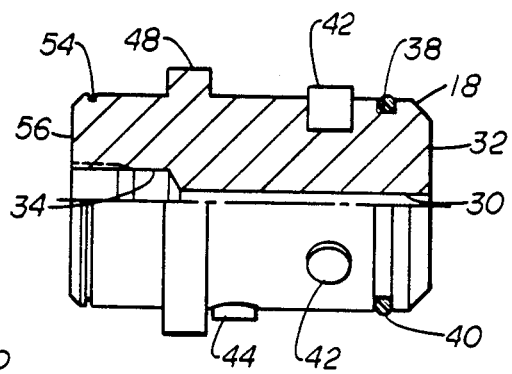
FIG. 2 is a view of the blanking plug shown in FIG. 1 with a portion of the plug being shown in section and the other portion being shown in elevation.

Blanking plug 18 includes body 28 having bore 30 extending therethrough from its inner end 32 and ending in counterbore 34 which is threaded to receive threaded sealing plug 36. Groove 38 extends around the exterior of body 28 near its inner end 32 and receives seal ring 40 which seals against sealing surface 20 when plug is in its sealing position as shown in FIG. 1. A plurality of pins 42 are secured to body 28 in a position spaced around body 28 as can be seen in FIGS. 2 and 3. Orienting pin 44 is secure in body 28 at a position to engage within orienting slot 46 as shown in FIG. 3. Flange 48 extends outwardly from plug body 28 at a position slightly outward or away from inner end 32. Securing ring 50 is supported around the exterior of plug body 28 between the outer side of flange 48 and the inner side of split ring 52 which is positioned in groove 54 around body 28 near outer end 56 of body 28. Securing ring 50 includes inwardly extending flange 58 which is secured between flange 48 and split ring 52 and inner threads 60 engage and coact with external threads 62 on body 10 surrounding the outer end of passage 16.

Blanking plug 18 is initially provided with securing ring 50 and when it is secured in place by split ring 52, plug 18 is inserted into passage 16 with pins 42 positioned to pass through slots 26 and thereafter plug 28 is rotated to position orienting pin 44 for entry into orienting slot 46 in lip 24. This rotation moves pins 42 out of alignment with slots 26. With plug 18 position as described, securing ring 50 is threaded inward to move pins 42 against shoulder 64 at the inner end of recess 22 and flange 48 against the exterior of body 10 surrounding the outer end of passage 16.

With the improved present invention installed as shown it will hold pressure within choke body 10 and in the event it is to be removed it can be released by unthreading securing ring 50 until seal ring 40 is within recess 22 and no longer in sealing engagement with sealing surface 20. This is the position illustrated in FIG. 4 and in this position of blanking plug 18, pressure is vented from the interior of choke body 10 without any danger that plug 18 will be ejected by the pressure contained in choke body 10. The pressure fluid is exhausted from the interior of securing ring 50 through port 66 which extends through securing ring 50. When the pressure fluid has been completely exhausted, securing ring 50 can be further unthreaded to allow plug 18 to be completely withdrawn from the interior of passage 16.

What is claimed is:
1. An apparatus for connecting into one of the passages of a choke body comprising
    a body adapted to fit within said one of the passages of the choke body,
    a securing ring positioned to engage said body and the choke body for moving said body into its secured position within said choke passage,
    means for sealing between the exterior of said body and the interior of said choke body passage when said body is positioned in said one of said passages with said sealing means engaging between the exterior of said body and the interior of said one passage so that the body and said sealing means closes and seals said one of said passages, and
    means for allowing limited outward movement of said body when said securing ring relaxes its securing of the body within said passage of said choke body which limited outward movement is sufficient to disengage said sealing means and
    orienting means cooperating with said limiting means to prevent discharge of said body from said passage of said choke body prior to said limited outward movement of said body disengaging said sealing means from said passage.

2. An apparatus according to claim 1 including
    a port extending through said securing ring for discharge of pressure fluid from within said choke body passage when said securing ring is relaxed sufficiently to disengage said sealing means without the discharge of said body from said choke body passage.

3. An apparatus according to claim 1 wherein said limiting means includes
    an inwardly extending lip at the end of said choke body passage, said lip having a plurality of slots therethrough,
    a plurality of pins extending radially outward from said body and having a length to pass through said slots and when said body is rotated to engage said lip and prevent discharge of said body from said choke body passage,
    said pins being spaced axially inward of said lip when said sealing means is in its sealing position to allow said body a limited amount of movement axially in said one passage with the relaxation of said securing means.

4. An apparatus for connecting into the opening of a tubular member having external threads around a portion of the exterior of said tubular member, an internal sealing surface and a recess terminating at the outer end of the tubular member in a slotted inwardly extending lip, comprising
    a body having an inner end and an outer end, an external groove around its exterior near one end, a plurality of radially extending pins spaced a preselected distance from said inner end and spaced to be received through the slots of said tubular member lip, a flange extending radially outward around said body near said outer end thereof,
    a securing ring having internal threads to mate with and thread on the tubular body external threads and an inwardly directed flange to be positioned in close spaced relationship around said body and on the outer side of said body flange,
    said pins having an external diameter smaller than the internal diameter of said tubular body recess and larger than the internal diameter of said tubular body lip, threading of said securing ring on said tubular member moving said body into said tubular member, means on said body for coacting with said tubular member lip to position said body pins out of alignment with said slots, and means for sealing between the exterior of said body near its inner end against said internal tubular body sealing surface when said body is secured fully within said tubular body, engagement of said pins with said lip on unthreading of said securing ring sufficient to move said pins into engagement with said lip moves said sealing means out of sealing engagement between said body and said tubular body sealing surface and prevents release of said body until it is positively rotated to align said pins with said slots.

5. An apparatus for connecting into one of the openings of a passage in a choke comprising a choke body having a plurality of passages being in communication with each other within the body, one of the passages having an inwardly extending lip at its outer end, an annular sealing surface at the inner end of said one of the passages and an annular recess between said lip and said annular sealing surface, a plurality of slots in said lip, a body to be positioned within said passage having an inner end, an outer end, an outer cylindrical surface with a first groove therein at a position near the inner end of said body, a plurality of pins secured in said body at a position spaced outward from said groove and extending outwardly to a diameter larger than the inner diameter of said lip, a flange extending radially outward from the outer surface of said body and a second groove around the exterior of said body a short distance from the outer end of said body and an orienting pin secured in said body at a position close to said flange and spaced axially from said pins, said orienting pin being out of axial alignment with each of said pins, a seal ring in said first groove for sealing against the sealing surface of said passage, a securing ring having means for engaging the exterior of said body surrounding said one of said passages, at least one port extending through said ring from its exterior to its interior and an inwardly extending flange sized to be positioned around the exterior of said body in position between said flange and said second groove, means associated with said second groove for securing said securing ring in position surrounding said body and allowing rotation of said ring independent of rotation of said body, the distance of said plurality of pins from said lip when installed being greater than the distance of said seal ring from the recess so that partial rotation of said securing ring allows said body to be moved outward to a position with said pins engaging said lip to vent pressure fluids past said seal and from said body through said securing ring port.

6. An apparatus according to claim 3 wherein said orienting means includes a pin extending radially outward from said body and having a length to pass through said slots, said pin being spaced axially within one of said slots to prevent rotation of said body when said sealing means is engaged, and said pin being spaced circumferentially to maintain said plurality of pins out of alignment with said slots when said securing means is relaxed.

* * * * *